United States Patent
Yetukuri et al.

(10) Patent No.: US 8,152,242 B2
(45) Date of Patent: Apr. 10, 2012

(54) SELECTIVE REMOTE HEAD RESTRAINT ACTUATION

(75) Inventors: Arjun Yetukuri, Rochester Hills, MI (US); Mladen Humer, West Bloomfield, MI (US); Ted Smith, Waterford, MI (US); Marc Stauske, White Lake, MI (US)

(73) Assignee: Lear Corporation, Southfield, MI (US)

( * ) Notice: Subject to any disclaimer, the term of this patent is extended or adjusted under 35 U.S.C. 154(b) by 428 days.

(21) Appl. No.: 12/358,910

(22) Filed: Jan. 23, 2009

(65) Prior Publication Data

US 2009/0184555 A1 Jul. 23, 2009

Related U.S. Application Data

(63) Continuation-in-part of application No. 10/907,503, filed on Apr. 4, 2005, now Pat. No. 7,484,808, and a continuation-in-part of application No. 11/857,163, filed on Sep. 18, 2007, now abandoned.

(51) Int. Cl.
*B60N 2/48* (2006.01)

(52) U.S. Cl. .......................................... 297/408; 297/61

(58) Field of Classification Search ................... 297/61, 297/378.12, 408, 410
See application file for complete search history.

(56) References Cited

U.S. PATENT DOCUMENTS

| | | | |
|---|---|---|---|
| 2,985,229 A | 5/1961 | Shamblin | |
| 3,498,670 A | 3/1970 | Finch et al. | |
| 4,623,166 A | 11/1986 | Andres et al. | |
| 4,637,655 A | 1/1987 | Fourrey et al. | |
| 4,671,573 A | 6/1987 | Nemoto et al. | |
| 4,682,817 A | 7/1987 | Freber | |
| 4,834,456 A | 5/1989 | Barros et al. | |
| 4,900,088 A * | 2/1990 | Bechtle et al. | 297/378.12 |
| 4,935,680 A | 6/1990 | Sugiyama | |
| 4,977,973 A | 12/1990 | Takizawa | |
| 5,052,754 A | 10/1991 | Chinomi | |
| 5,071,190 A | 12/1991 | Tame | |
| 5,145,233 A | 9/1992 | Nagashima | |
| 5,419,616 A * | 5/1995 | Paetzold | 297/378.12 |
| 5,433,503 A | 7/1995 | De Filippo | |
| 5,540,479 A | 7/1996 | Thomas et al. | |
| 5,590,933 A | 1/1997 | Andersson | |
| 5,628,543 A | 5/1997 | Filipovich et al. | |
| 5,664,841 A * | 9/1997 | Dal Monte | 297/408 |
| 5,669,668 A | 9/1997 | Leuchtmann | |
| 5,681,079 A | 10/1997 | Robinson | |
| 5,700,054 A | 12/1997 | Lang | |
| 5,704,685 A | 1/1998 | Handa et al. | |
| 5,738,411 A | 4/1998 | Sutton et al. | |

(Continued)

FOREIGN PATENT DOCUMENTS

DE 1755382 8/1971

(Continued)

*Primary Examiner* — Peter R. Brown

(74) *Attorney, Agent, or Firm* — Brooks Kushman P.C.

(57) ABSTRACT

A head restraint actuation system includes a head restraint positionable in an upright and folded position. Repositioning of the head restraint is accomplished through the action of a head restraint actuator. The head restraint actuator is in communication with the head restraint. An actuating cable system includes a cable that is in communication with the head restraint actuator and a user operated handle. User initiated movement of the handle causes movement of the cable thereby causing the head restraint to be positioned in the folded position. The activation system is able to simultaneously actuate a plurality of head restraints.

9 Claims, 4 Drawing Sheets

U.S. PATENT DOCUMENTS

| | | | |
|---|---|---|---|
| 5,826,942 A * | 10/1998 | Sutton et al. | 297/378.12 |
| 5,906,414 A | 5/1999 | Rus | |
| 6,000,760 A | 12/1999 | Chung | |
| 6,050,633 A | 4/2000 | Droual | |
| 6,074,011 A | 6/2000 | Ptak et al. | |
| 6,113,192 A | 9/2000 | Schneider | |
| 6,129,421 A | 10/2000 | Gilson et al. | |
| 6,192,565 B1 | 2/2001 | Tame | |
| 6,299,254 B1 | 10/2001 | Dinh et al. | |
| 6,390,558 B2 * | 5/2002 | Fischer et al. | 297/410 |
| 6,447,068 B1 | 9/2002 | Anderson et al. | |
| 6,508,512 B2 | 1/2003 | Saberan et al. | |
| 6,550,856 B1 * | 4/2003 | Ganser et al. | 297/61 |
| 6,550,865 B2 | 4/2003 | Cho | |
| 6,572,188 B2 | 6/2003 | Ozawa | |
| 6,612,653 B2 | 9/2003 | Takata | |
| 6,616,236 B1 | 9/2003 | Su | |
| 6,789,845 B2 | 9/2004 | Farquhar et al. | |
| 6,802,562 B1 | 10/2004 | Hake et al. | |
| 6,860,564 B2 | 3/2005 | Reed et al. | |
| 6,926,367 B2 | 8/2005 | Tomimatsu | |
| 6,935,696 B2 | 8/2005 | Gauthier et al. | |
| 6,955,397 B1 | 10/2005 | Humer | |
| 7,044,544 B2 | 5/2006 | Humer et al. | |
| 7,118,171 B2 | 10/2006 | Fowler et al. | |
| 7,152,923 B2 * | 12/2006 | Charras et al. | 297/378.12 |
| 7,178,865 B2 | 2/2007 | Yetukuri et al. | |
| 7,234,778 B1 | 6/2007 | Toba | |
| 7,237,843 B2 | 7/2007 | Clark et al. | |
| 7,258,400 B2 | 8/2007 | Yamada | |
| 7,325,877 B2 | 2/2008 | Brockman et al. | |
| 7,367,626 B2 | 5/2008 | Lawall et al. | |
| 7,429,082 B2 | 9/2008 | Kraft et al. | |
| 7,431,399 B2 | 10/2008 | Kern et al. | |
| 7,484,808 B2 | 2/2009 | Yetukuri et al. | |
| 7,530,638 B2 * | 5/2009 | Day et al. | 297/378.12 |
| 2002/0079732 A1 | 6/2002 | Saberan et al. | |
| 2002/0084686 A1 | 7/2002 | Takata | |
| 2003/0015898 A1 | 1/2003 | Breed | |
| 2004/0036329 A1 | 2/2004 | Ashton et al. | |
| 2004/0061362 A1 | 4/2004 | Farquhar et al. | |
| 2004/0113480 A1 | 6/2004 | Reed et al. | |
| 2004/0195872 A1 | 10/2004 | Svantesson | |
| 2005/0140198 A1 | 6/2005 | Ashton et al. | |
| 2005/0156456 A1 | 7/2005 | Robinson et al. | |
| 2005/0179301 A1 | 8/2005 | Clark et al. | |
| 2005/0225146 A1 | 10/2005 | Sutter et al. | |
| 2005/0242640 A1 | 11/2005 | Barko et al. | |
| 2005/0248198 A1 | 11/2005 | Fowler et al. | |
| 2005/0264078 A1 | 12/2005 | Saberan | |
| 2006/0006720 A1 | 1/2006 | Yamada | |
| 2006/0012233 A1 | 1/2006 | Karlberg | |
| 2006/0061187 A1 | 3/2006 | Gauthier et al. | |
| 2006/0071517 A1 | 4/2006 | Humer et al. | |
| 2006/0103189 A1 | 5/2006 | Humer et al. | |
| 2006/0103190 A1 | 5/2006 | Humer et al. | |
| 2006/0162076 A1 | 7/2006 | Bartlett et al. | |
| 2006/0163928 A1 | 7/2006 | Droche | |
| 2006/0220433 A1 | 10/2006 | Yetukuri et al. | |
| 2006/0226690 A1 | 10/2006 | Neale | |
| 2007/0001500 A1 | 1/2007 | Kraft et al. | |
| 2007/0132299 A1 | 6/2007 | Fernandez De La Pradilla et al. | |
| 2007/0132300 A1 | 6/2007 | Toba | |
| 2007/0152487 A1 | 7/2007 | Brockman et al. | |
| 2007/0236069 A1 | 10/2007 | Chung | |
| 2007/0236070 A1 | 10/2007 | Brockman | |
| 2007/0296260 A1 | 12/2007 | Stossel | |
| 2008/0203801 A1 | 8/2008 | Jammalamadaka et al. | |

FOREIGN PATENT DOCUMENTS

| | | |
|---|---|---|
| DE | 3020558 A1 | 12/1981 |
| DE | 3436509 A1 | 4/1986 |
| DE | 3843624 A1 | 7/1989 |
| DE | 102006014832 A1 | 10/2006 |
| JP | 1120528 A | 1/1999 |

* cited by examiner

SELECTIVE REMOTE HEAD RESTRAINT ACTUATION

CROSS REFERENCE TO RELATED APPLICATIONS

This application is a continuation-in-part of U.S. application Ser. No. 10/907,503, filed Apr. 4, 2005, now U.S. Pat. No. 7,484,808 issued Feb. 3, 2009, and a continuation-in-part of U.S. application Ser. No. 11/857,163, filed Sep. 18, 2007, now abandoned. The entire disclosures of these applications are hereby incorporated by reference.

BACKGROUND OF THE INVENTION

1. Field of the Invention

In at least one aspect, the present invention relates to head restraint actuation systems that are operable by passengers in a forward vehicle location.

2. Background Art

Modern automobile interior design seeks to provide low cost with multi-functionality. Such considerations include safety, aesthetics, and economics. Head restraints are an important automobile interior component that offer protection in a rear impact.

A seat assembly may include a head restraint assembly pivotally attached to a seat back such that the head restraint cushion is moveable between a raised position and a lowered position. The head restraint cushion may be pivoted to the lowered position by pulling on a strap extending from the head restraint cushion.

In another known rear seat assembly, an electronic mechanism is provided for pivoting a head restraint cushion with respect to a seat back. This assembly further includes a push button disposed between two front seat assemblies, or on an overhead console, for activating the electronic mechanism. It is readily appreciated that a rear seat back in a raised position may interfere with driver visibility at times. Most head restraint systems do not provide the driver or other forward vehicle occupant with a convenient mechanism to lower a rear seat head restraint.

Accordingly, there exists a need for improved head restraint designs that enable remote actuation of head restraints.

SUMMARY OF THE INVENTION

The present invention solves one or more problems of the prior art by providing in at least one embodiment, a remote head restraint actuation system. The head restraint actuation system of the present embodiment allows a user to reposition a head restraint from an upright to a lowered position from a forward position in a vehicle compartment. Specifically, the present embodiment allows a person sitting in a forward seat to lower head restraints in more rearward positioned seats. The head restraint actuation system of the present embodiment includes a head restraint positionable in an upright (sometimes referred to as a raised position) and folded position. Repositioning of the head restraint is accomplished through the action of a head restraint actuator. The head restraint actuator is in communication with the head restraint. An actuating cable system includes a cable that is in communication with the head restraint actuator and a user operated handle. User initiated movement of the handle causes movement of the cable thereby causing the head restraint to be positioned in the folded position.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
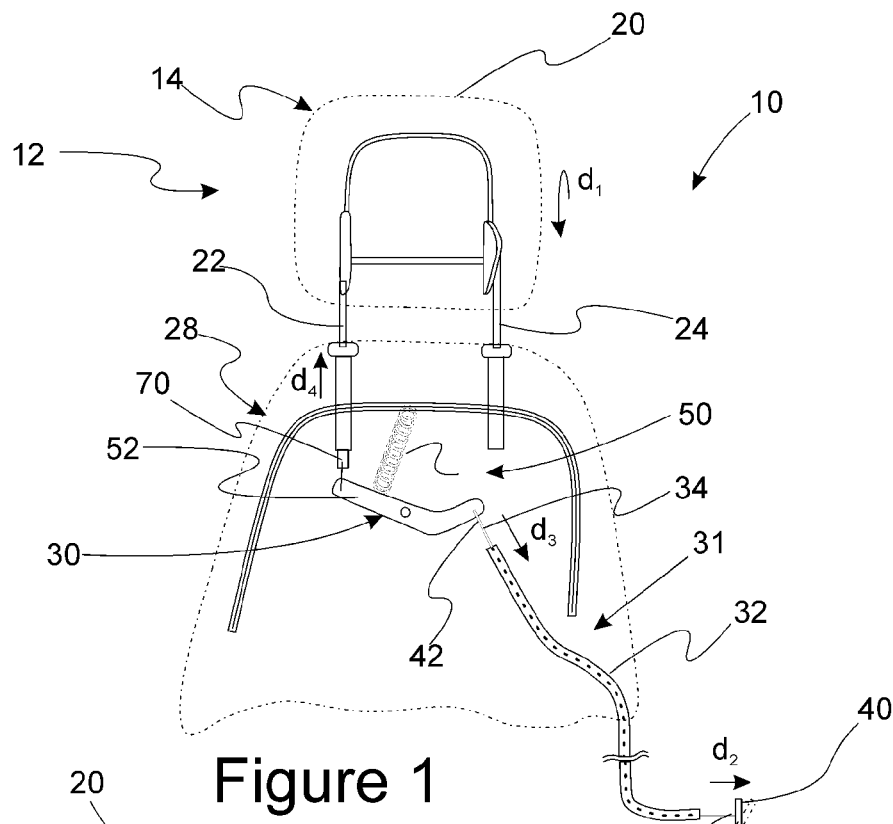
FIG. 1 is a front perspective view of a head restraint actuator system.
Figure 2:
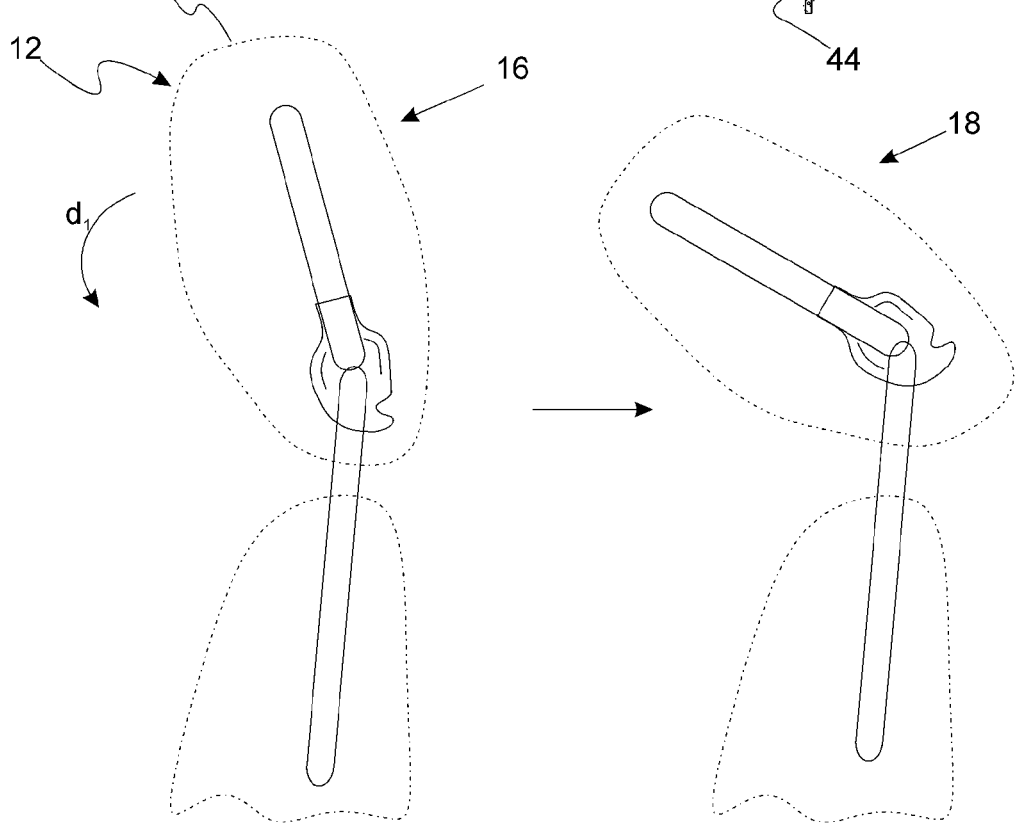
FIG. 2 is a side view illustrating positioning of a head restraint transitioning from the upright to the folded position via operation of the head restraint actuator system of FIG. 1.

With reference to FIGS. 1 and 2, diagrams illustrating an embodiment of a remote head restraint actuator system is provided. FIG. 1 is a front perspective view of the head restraint actuator system. FIG. 2 is a side view illustrating positioning of the head restraint transitioning from the upright to the folded position. Remote head restraint actuator system 10 is positioned in vehicle seat 12 which includes head restraint 14. Head restraint 14 is positionable in an upright position 16 and folded position 18. Head restraint 14 as depicted in FIG. 1 include outer cushion 20. Posts 22, 24 are used to mount head restraint 14 to seat back 28. Posts 22, 24 are moveable attached to seat back 28.

Remote head restraint actuator system 10 further includes head restraint actuator 30 in communication with head restraint 14. Head restraint actuator 30 is operable to move the head restraint from upright position 16 to folded position 18 along direction $d_1$. Actuating cable system 31 includes outer sheath 32 and cable 34. Cable 34 is moveable within outer sheath 32. Outer sheath 32 is attached to vehicle seat back 28 such that cable 34 is able to move relative to outer sheath 32 when the handle 40 is moved. Cable 34 includes first end 42 in communication with head restraint actuator 30. Handle 40 is in communication with second end 44 of cable 34 such that user initiated movement of the handle 40 along direction $d_2$ causes movement of cable 34 relative to outer sheath 24 thereby initiating actuation of head restraint actuator 30. This actuation causes head restraint 14 to be positioned in folded position 18. Handle 40 is reachable from a forward vehicle interior position, i.e., a vehicle occupant can reach the handle from a seat that is in a position in front of the seat incorporating the actuating system of the invention.

Figure 3A:
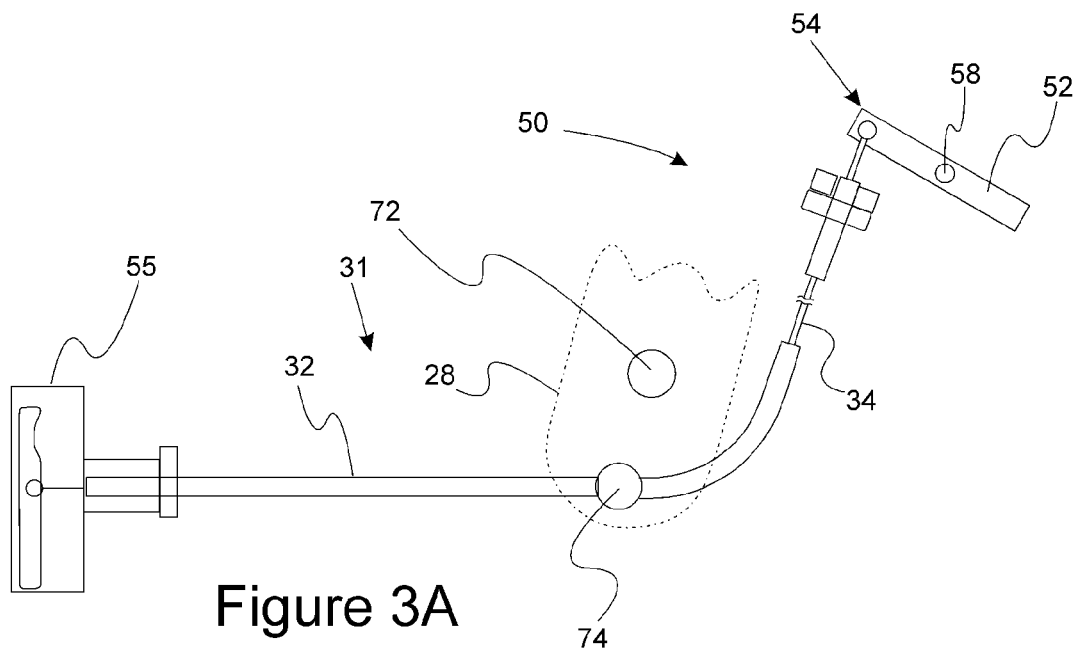
FIG. 3A is a schematic illustration of a lever system prior to actuation.
Figure 3B:
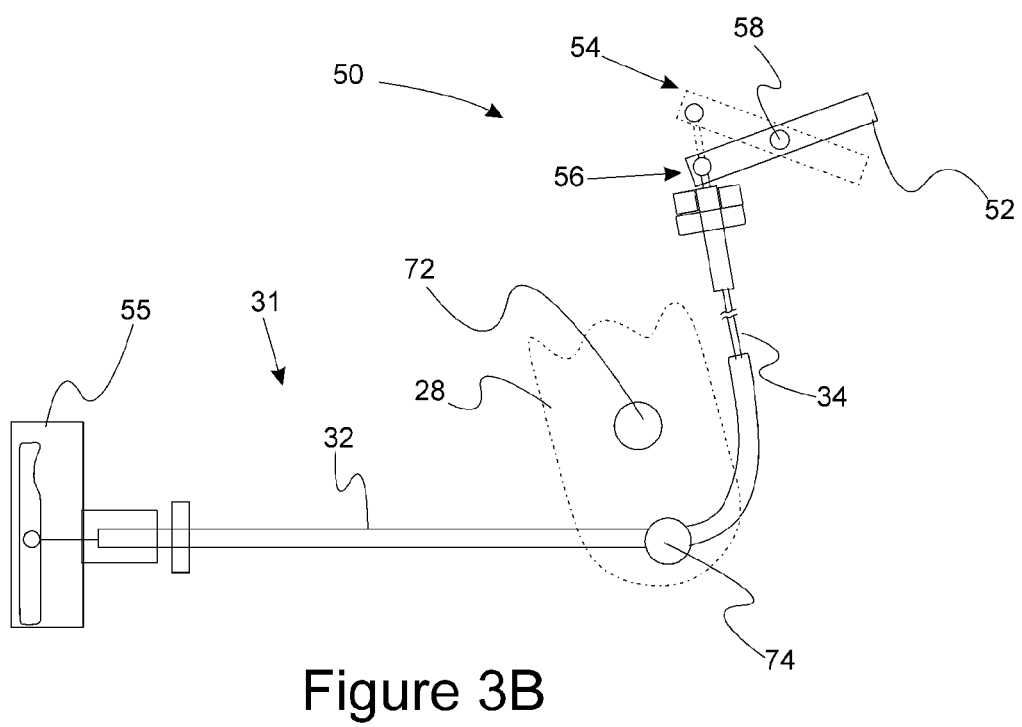
FIG. 3B is a schematic view of the lever system of FIG. 3A after actuation initiated by folding of the seat back.

With reference to FIGS. 1, 3A, and 3B, illustrations of an embodiment utilizing a lever system for head restraint actuator 30 is provided. FIG. 3A is a schematic illustration of the lever system prior to actuation. FIG. 3B is a schematic view of the lever system after actuation initiated by folding of the seat back. Lever system 50 includes lever 52 which is positionable in first position 54 and second position 56. Lever 52 is pivotable about pivot point 58. Lever 52 is in communication with first end 42 of the cable 34 such that operation of handle 40 causes positioning of the lever 52 into second position 56. Handle 40 is in communication with second end 44 which moves along direction $d_2$. Cable 34 in the vicinity of first end 42 moves relative to outer sheath 32 along direction $d_3$. The variation depicted in FIGS. 1, 3A, and 3B illustrated movement along $d_4$ that moves push rod 70 towards the actuation mechanism is head restraint 14 which responds to this motion of push rod 70. This movement of push rod 70 causes head restraint 14 to be positioned in the folded position 18.

FIGS. 3A and 3B depict a refinement in which folding of seat back 28 initiates actuation of actuator system 10. Seat back 28 is pivotable about pivot axis 72. Outer sheath 32 is attached to seat back 28 at position 74. Since lever system 50 is fixed to seat back 28, folding causes outer sheath 32 to be pulled relative to handle 55 which causes cable 34 to be pulled relative to sheath 32 with movement of lever 50 from position 52 to 54.

Figure 4:
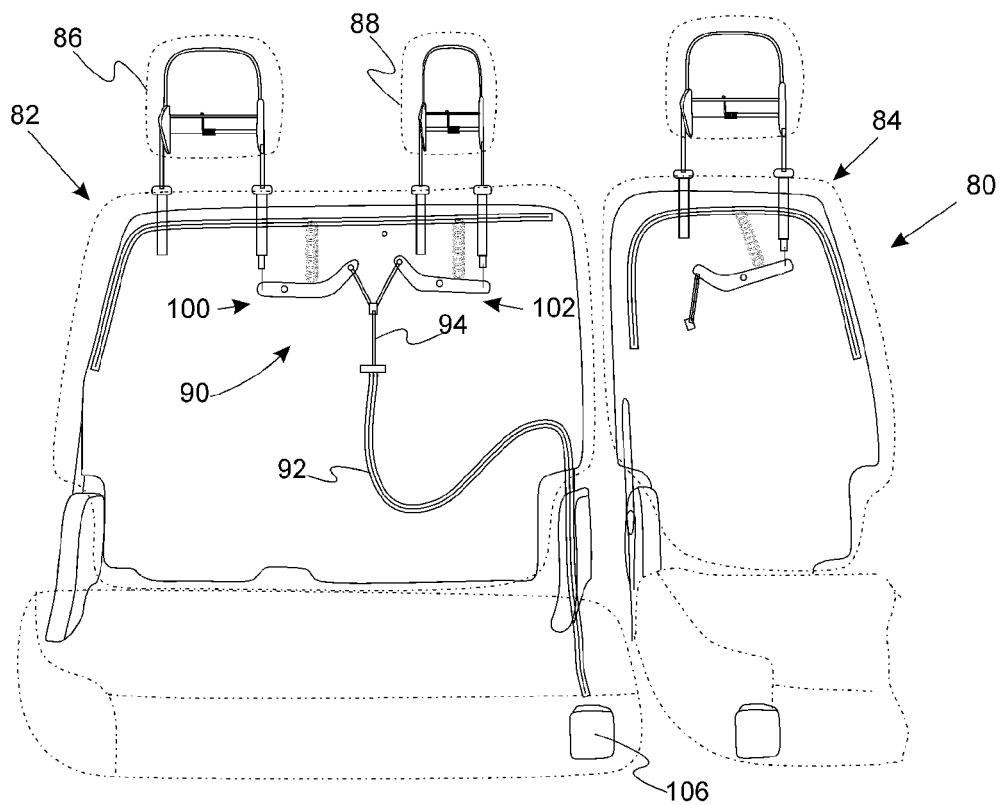
FIG. 4 is a front perspective view of a three occupant seat system.
Figure 4:
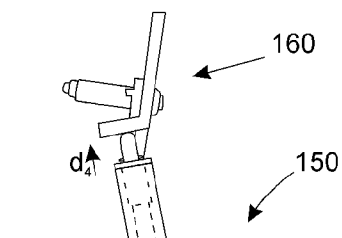

With reference to FIG. 4, a front perspective view of a three occupant seat system is provided. Vehicle seat system 80 includes vehicle seats 82, 84. Vehicle seat 82 is a single person seat with an actuation system as set forth above in connection with the description of FIGS. 1, 2, 3A, and 3B. Vehicle seat 82 is a two person seat. Vehicle seat 82 includes head restraints 86, 88 which are actuated by actuation system 90. Actuation system 90 includes outer cable sheath 92 and cable 94. Actuation system 90 also includes two lever systems 100, 102. Each of lever systems 100, 102 are of the design set forth above. Cable 94 is bifurcated so that attachment is made to each of lever systems 100, 102. In the design depicted in FIG. 4, handle 106 causes movement of cable 94 so lever systems 100, 102 move substantially in parallel.

Figure 5A:
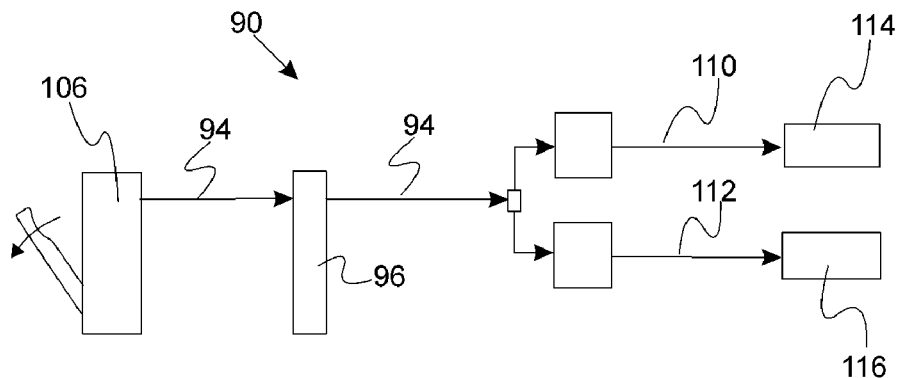
FIG. 5A is a block diagram of an actuation system using a bifurcated cable to simultaneously actuate two head restraints.
Figure 5B:
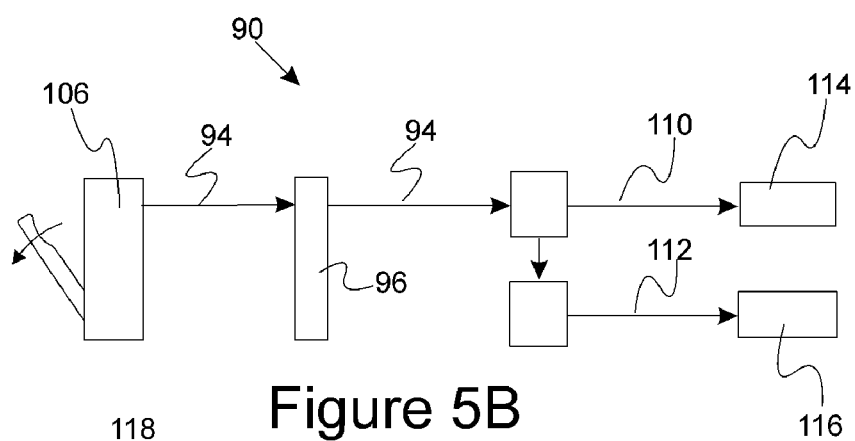
FIG. 5B is a block diagram of an actuation system using a bifurcated cable to sequentially actuate two head restraints.
Figure 5C:
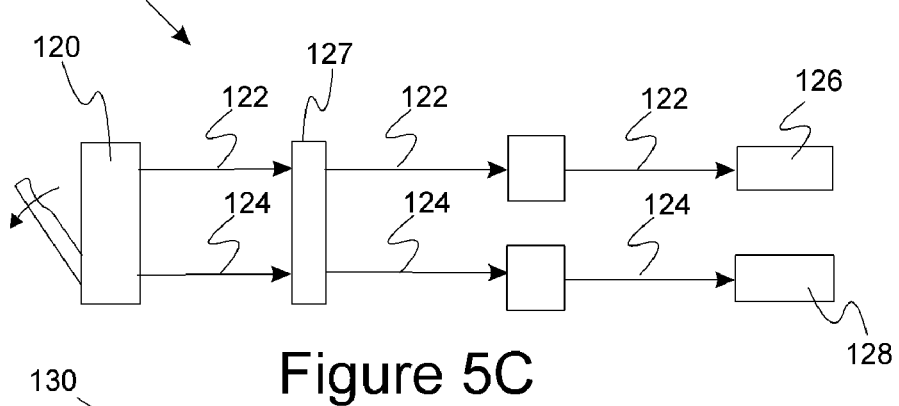
FIG. 5C provides an illustration for an actuation system that utilizes completely separate cables for each head restraint.
Figure 5D:
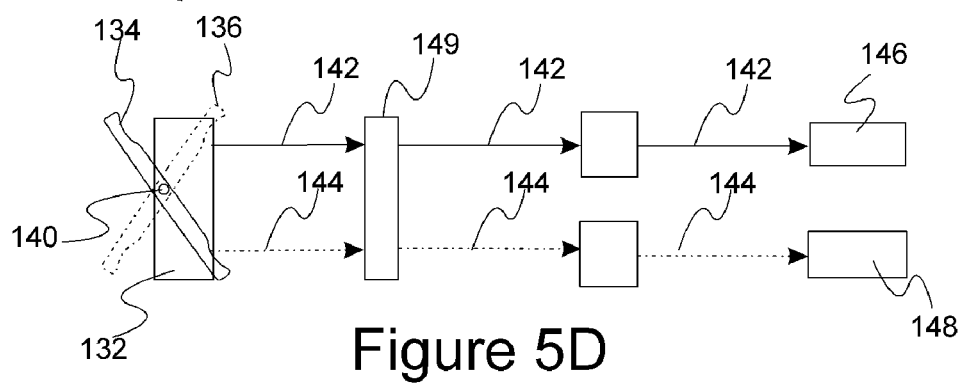
FIG. 5D provides an illustration for an actuation system that allows individual actuation of a pair of head restraint actuators.

With reference to FIGS. 5A, 5B, 5C, and 5D, block diagrams of various refinements for actuating a plurality of head restraints are provided. FIG. 5A provides an illustration for the system depicted in FIG. 4. Actuation system 90 includes handle 106 which is in communication with cable 94. Cable 94 is moveable relative to seat back 96. Cable 94 is bifurcated into sub-cables 110, 112 which are in communication with head restraint actuators 114, 116. Operation of handle 106 acts to pull cable 94 which in turn simultaneously acts to pull sub-cables 110, 112. In this variation, actuators 114, 116 are activated substantially simultaneously when handle 106 is pulled. FIG. 5B provides a variation in which cables 110 activates actuator 114 prior to cable 112 activating actuator 116. The unsymmetrical arrangement of cables 110 and 112 allow such sequencing. FIG. 5C provides an illustration for an actuation system that utilizes completely separate cables for each head restraint. In this variation, a plurality of head restraints may be simultaneously folded. Actuation system 118 includes handle 120 and cables 122, 124. Cable 122 is in communication with head restraint actuator 126 while cable 124 is in communication with head restraint actuator 128. Cables 122, 124 are moveable relative to seat back 127. Operation of handle 120 causes a pulling of both cables 122, 124 substantially simultaneously. In a refinement of the present variation, there is delay between actuation of head restraint 126 and head restraint 128. FIG. 5D provides an illustration for an actuation system that allows individual actuation of a pair of head restraint actuators. Actuation system 130 includes handle 132 that is positionable in positions 134, 136 by pivoting about pivot axis 140. When handle 132 is pivoted to position 134, cable 142 is pulled such that head restraint actuator 146 causes the head restraint to move to the folded position. Similarly, when handle 132 is pivoted to position 136, cable 144 is pulled such that head restraint actuator 148 causes the head restraint to move to the folded position. Cables 142, 144 are moveable relative to seat back 149.

Figure 7:
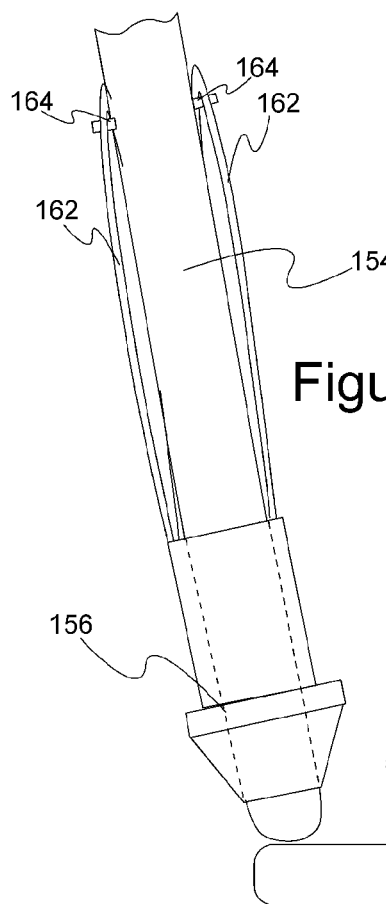
FIG. 7 is a perspective view of a bushing useable in the push rod assembly of FIG. 6.
Figure 6:
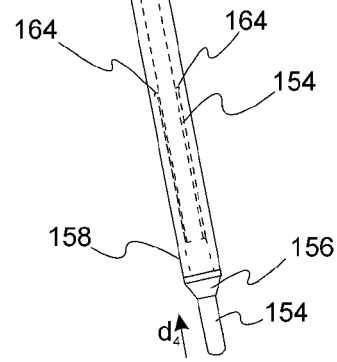
FIG. 6 is a perspective view of a push rod assembly that may be used in the head restraint actuators of the invention.

As set forth above, variations of the actuating systems utilize a push rod assembly. With reference to FIGS. 6 and 7, a schematic illustration of a variation of a push rod system useable in the embodiments of the actuation system is provided. FIG. 6 is a perspective view of such a push rod assembly. FIG. 7 is a perspective view of a bushing useable in the push rod assembly of FIG. 6. Push rod assembly 150 includes hollow support member 152 and moveable rod 154 that moves within the hollow support member. It should be appreciated that support member 152 is part of a head restraint push rod assembly. Biasing bushing 156 is attached to end 158 of hollow support member 152. In variations of the actuating systems of the invention, the lever system pushes rod 154 upward along direction $d_4$ such that head restraint actuator components 160 which are positioned within the head restraint cause the head restraint to fold.

With reference to FIGS. 6 and 7, biasing bushing 156 includes one or more integral biasing bands 162. Typically, there are two biasing bands. Biasing bushing 156 is typically made from a flexible material such as a plastic or rubber so that biasing bands 162 are reversibly stretchable. Biasing bands 162 are attached to rod 154 at attachment rods 164. Biasing bands 162 provide a restoring force that acts as an opposing force to the force applied when the actuation system pushes rod 154 upward along direction $d_4$.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A remote head restraint actuation system comprising:
    a seat back;
    a head restraint positionable in an upright and folded position, the head restraint moveably attached to the seat back;
    a rod assembly in communication with the head restraint and the seat back, the rod assembly having a moveable rod that moves within a hollow support member;
    a biasing bushing attached to an end of the rod assembly, the biasing bushing having at least one biasing member that is attached to a moveable rod, the biasing bushing permitting movement of the moveable rod through the biasing bushing while the biasing member provides a restoring force to the biasing bushing;
    a head restraint actuator in communication with the rod assembly, the head restraint actuator operable to move the head restraint from the upright to the folded position;
    an actuating cable system having a cable, the cable having a first end in communication with the head restraint actuator; and
    a handle attached to a second end of the cable such that user initiated movement of the handle causes movement of the head restraint actuator causing the head restraint to be positioned in the folded position.

2. The head restraint actuation system of claim 1 wherein the biasing member includes a spring.

3. The head restraint actuation system of claim 1 wherein the biasing member has at least one biasing band.

4. The head restraint actuation system of claim 1 wherein the moveable rod further includes a stop that limits movement of the moveable rod towards the biasing bushing.

5. The head restraint actuation system of claim 1 further comprising a lever having a first position and a second position, the lever in communication with the first end of the cable such that operation of the handle causes placement of the lever in the second position thereby causing the head restraint to be positioned in the folded position.

6. The head restraint actuation system of claim 1 operable to actuate a plurality of head restraints.

7. The head restraint actuation system of claim 6 wherein each head restraint of the plurality of head restraints has an associated actuating cable system.

8. The head restraint actuation system of claim 1 wherein a single cable is in communication operable to actuate plurality of head restraints.

9. The head restraint actuation system of claim 1 wherein the handle is positionable in a first handle position and second handle position, the first handle position actuating a first head restraint and the second handle position actuating a second head restraint.

* * * * *